(12) United States Patent
Chidlovskii

(10) Patent No.: US 6,347,314 B1
(45) Date of Patent: Feb. 12, 2002

(54) ANSWERING QUERIES USING QUERY SIGNATURES AND SIGNATURES OF CACHED SEMANTIC REGIONS

(75) Inventor: Boris Chidlovskii, Meylan (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/314,874

(22) Filed: May 19, 1999

(30) Foreign Application Priority Data

May 29, 1998 (EP) ............................................. 98401312

(51) Int. Cl.⁷ .............................................. G06F 17/30

(52) U.S. Cl. ........................ 707/3; 707/5; 707/6; 707/4

(58) Field of Search .......................... 707/2.4, 63, 103, 707/104, 3; 713/175, 158, 186; 709/328, 310; 717/6; 345/424; 712/216, 205; 711/206, 202

(56) References Cited

U.S. PATENT DOCUMENTS

| | | | | |
|---|---|---|---|---|
| 5,319,779 A | * | 6/1994 | Chang et al. ................... | 707/3 |
| 5,542,090 A | * | 7/1996 | Henderson et al. ............ | 707/2 |
| 5,819,286 A | * | 10/1998 | Yang et al. ................. | 707/104 |
| 5,819,288 A | * | 10/1998 | De Bonet .................... | 707/104 |
| 5,913,205 A | * | 6/1999 | Jain et al. ....................... | 707/2 |
| 6,012,085 A | * | 1/2000 | Yohe et al. .................. | 709/217 |
| 6,035,303 A | * | 3/2000 | Baer et al. .................. | 707/103 |

OTHER PUBLICATIONS

Dar et al., "Semantic Data Caching and Replacement" Proceeding of the 22nd VLDB conf., 1996. , pp. 330–332.*
S. Adali, K. S. Candan, Y. Papakonstantinou, V. S. subrahmanian., Query Caching and Optimization in Distributed Mediator Systems. In Proc. SIGMOD '96 Conf., pp. 137–148, 1996.

Y. Arens and C. A. Knoblock. Intelligent Caching: Selecting Representing, and Reusing Data in an Information Server. In Proc. CIKM '94 Conf., Gaithersburg, MD, pp. 433–438, 1994.

(List continued on next page.)

Primary Examiner—Jack Choules
Assistant Examiner—Mohammad Ali
(74) Attorney, Agent, or Firm—Oliff & Berridge, PLC

(57) ABSTRACT

In a system with cache that includes contents for each of a set of semantic regions, a query signature corresponding to a query is obtained. The query signature is used, together with a region signature for at least one of the regions, to find one or more semantic regions that are qualified and to use the contents of at least one of the qualified regions to obtain an answer to the query. The signatures can, for example, be binary strings, all having the same length. If the query and region formula are each a conjunction of terms, a signature can be obtained for each term and term signatures can be combined to obtain a query or region signature. Each signature can, for example, be a binary string, with all signatures having the same length so that signatures can be combined by performing logical operations. The query signature can be compared with the region signatures to determine whether the query is equivalent to or contained in any of the regions, in which case an answer can be obtained from cached contents. If not, another comparison can be made, either to determine whether any of the regions are contained within the query or to determine whether the query is likely to have a one-term difference with any of the regions. In these cases, a partial answer to the query can be obtained from cached contents that match the query, and a query remainder can be sent to obtain content necessary for a complete answer.

18 Claims, 14 Drawing Sheets

OTHER PUBLICATIONS

P. Godfrey an J. Gryz. Semantic query Caching For Heterogeneous Databases. In Proc. $4^{th}$ KRDB Workshop on Intelligent Access to Heterogeneous Information, Athens, Greece, pp. 6.1–6.6, 1997.

Reck, C. and B. Koenig–Ries (1997). *An Architecture for Transparent Access to Semantically Heterogeneous Information Sources.* 1st Int. Workshop on Cooperative Information Agents –LNCS 1202, Kiel, Germany pp. 260–271.

Tavakoli N., "A Multilevel Signature Approach For Retrieval Of Uniformed Data", Apr. 9–12, 1989, IEEE, pp. 1316–1320.*

Tavakoli N. "An Architecture for Parallel Search of Large, Full–text Databases" Mar. 7–9, 1990, ISBN:0–8186–2035–8, pp. 342–349.*

* cited by examiner

| Region formula : | query ∧ caching |
|---|---|
| Term signatures : | |
| query | 0010 0010 1000 |
| caching | 0100 0100 0001 |
| Region signature : | 0110 0110 1001 |

FIG. 2A

| Queries | Query Signatures | Results |
|---|---|---|
| 1) Web | 1000 0001 1000 | no match |
| 2) caching | 0100 0100 0001 | region containment |
| 3) query∧ caching | 0110 0110 1001 | equivalence |
| 4) Web∧ query∧ caching | 1110 0111 1001 | query containment |
| 6) ski∧ resort | 0110 0110 1001 | false drop |

FIG. 2B

ANSWERING QUERIES USING QUERY SIGNATURES AND SIGNATURES OF CACHED SEMANTIC REGIONS

FIELD OF THE INVENTION

The present invention relates to techniques for obtaining answers to queries, where the answers include items of data that have been cached for semantic regions.

BACKGROUND

Tavakoli, N., and Ray, A., "A New Signature Approach for Retrieval of Documents from Free-Text Databases", *Information Processing & Management*, Vol. 28, No. 2, 1992, pp. 153–163, describes a signature approach to information retrieval in which the sizes of signature files are dependent on the number of unique symbols in the alphabet. A signature maintains the positional information of characters and allows for Don't Care Characters to be used in queries.

In client-server information systems, local client memory is largely used to cache data and to minimize future interaction with servers. This data caching is particularly important on the World Wide Web ("the Web" or "WWW") and on similar network-based information retrieval systems in which network traffic and slow servers can lead to long delays in delivery of information. As standard page-based caching is technically impractical on the Web and tuple-based caching has certain limitations, much effort has been spent to cache user queries and answers for possible future reuse. Such techniques are described, for example, in Godfrey, P., and Gryz, J., "Semantic Query Caching For Heterogeneous Databases", in *Proceedings of the 4th KRDB Workshop, "Intelligent Access to Heterogeneous Information"*, Athens, Greece, 1997, pp. 6-1 to 6-6.

Query caching is particularly advantageous when the user refines a query quite often, for example, by adding or removing a keyword. In this case, many answer tuples may already be cached and can be delivered to the user right away.

A Web-based query system can contact heterogeneous distributed data repositories or servers, can invoke so-called wrappers to convert user queries into a target query language appropriate for the servers, and can control the data flow from the servers. As data are usually transferred over the network in HTML format, the wrappers can also extract answer tuples from the retrieved HTML files before the final answer is reported to the user and stored in the cache.

A typical Web query is a conjunction of terms. Each term in the query can be a keyword, possibly negated with the operator NOT, and can be applied to one or more attributes (title, author, etc.). In most Web servers, the operator NOT is equivalent to AND NOT to force a query to contain at least one non-negated term.

Semantic caching can manage a client cache as a collection of semantic regions; access information is managed and cache replacement is performed at the unit of semantic regions. Such a technique is described in Dar, S., Franklin, M. J., Jonsson, B. T., Srivastava, D., and Tan, M., "Semantic Data Caching and Replacement", in *Proceedings of the 22$^{nd}$ VLDB Conference, Mumbai (Bombay), India*, 1996, pp. 330–341. Semantic regions group together semantically related documents covered, for example, by a user query.

In semantic caching, each semantic region can have a constraint formula which describes its contents, a counter of tuples in the contents, a pointer to the set of actual tuples in the cache, and the additional information that is used by the replacement policy to rank the regions.

When a query is posed at a client, it can be split into two disjoint pieces: (1) the portion of the answer available in the local cache, and (2) a remainder query, which retrieves any missing tuples in the answer from the server. If the remainder query is not null (i.e., the query covers parts of the information space that are not cached), the remainder query is sent to the server and processed there.

SUMMARY OF THE INVENTION

The invention addresses problems that arise in using a cache that includes items of data for semantic regions.

Although a number of important principles of query caching have been proposed, conventional query caching techniques do not provide efficient methods for evaluating or comparing a query against cached items in obtaining an answer to the query. Moreover, query evaluation is reduced in some techniques to a Datalog query evaluation, which may be computationally hard.

The present invention provides a technique that alleviates problems in evaluating or comparing a query against cached items. The technique can be implemented in a system that includes memory with a set of cache locations. The cache includes, for each of a set of one or more semantic regions, contents with one or more items of data. The technique responds to a query by obtaining a query signature and by using the query signature and region signatures for at least one of the semantic regions in finding one or more semantic regions that are qualified and using the contents of at least one of the qualified regions to obtaining an answer to the query.

Signatures simplify operations that evaluate or compare a query with semantic regions to find regions that are qualified. As a result, the technique can be implemented to obtain simple and efficient query evaluation or comparison, making it possible to perform query evaluation in time that is not greater than linear with the number of cached items of data and may be less than linear.

The technique can be implemented using a system that caches Web queries. Each semantic region's entry in the cache can include a signature for the region.

For a query or region formula that includes a conjunction of terms, the signature can be obtained by combining signatures for the terms. Each signature can be a binary string, and all can have the same length, so that they can be combined by logical operations.

A query signature can be compared to region signatures stored in the cache. If the comparison indicates that the query is equivalent to or contained within one of the regions, an answer can be obtained from cached items of data. In other cases, a criterion can be applied to find cached items of data that are qualified for the query, i.e., cached items of data that can be re-used immediately in obtaining a partial answer; missing information can be requested by sending a query remainder to a server. The criterion can be a region containment criterion or a criterion that is only met by regions that are likely to have a one-term difference from the query.

The technique can also be implemented in a system that includes a memory with a cache defined as described above and a processor connected for accessing the memory. The processor can obtain the query, use the query to obtain a query signature, use the query signature and at least one region signature to find one or more semantic regions that are qualified, and use the contents of at least one of the qualified regions to obtain an answer to the query, as described above. The system can also include one or more user interface devices through which the processor can provide signals to and receive signals from a user. The processor can obtain the query by receiving signals indicating the query from a user through one of the user interface devices and can also provide the answer to the query to the user through one of the user interface devices. The system can have a connection to the internet, and the query can be a Web query.

The technique can also be implemented in an article of manufacture that includes a storage medium and instruction data stored on the storage medium indicating a sequence of instructions. When the instruction data are accessed by a storage medium access device in a system, the system's processor, in executing the instructions, can obtain the query, use query to obtain a query signature, use the query signature and at least one region signature to find one or more semantic regions that are qualified, and use the contents of at least one of the qualified regions to obtain an answer to the query, as described above.

The technique has three main advantages. First, it makes it possible to process both of the following cases in the same elegant way—1) when a query is contained in the cache, or 2) when it intersects some regions. As a result, the technique can avoid most cases of tuple duplications, and has a moderate storage requirement. Second, it supports efficient reporting of partial answers and generating of query remainders. Finally, it provides a simple solution for region coalescing and replacement policy problems.

The following description, the drawings, and the claims further set forth these and other aspects, objects, features, and advantages of the invention.

BRIEF DESCRIPTION OF THE DRAWINGS

FIG. 2A shows a sequence of expressions illustrating how a region signature can be obtained from a region formula.

FIG. 2B is a table illustrating sample queries, their signatures, and the results of comparing their signatures with the region signature in FIG. 2A.

FIG. 4B showing multiple region containment; FIG. 4C showing single query containment; and FIG. 4D showing multiple query containment.

DETAILED DESCRIPTION

Figure 1:
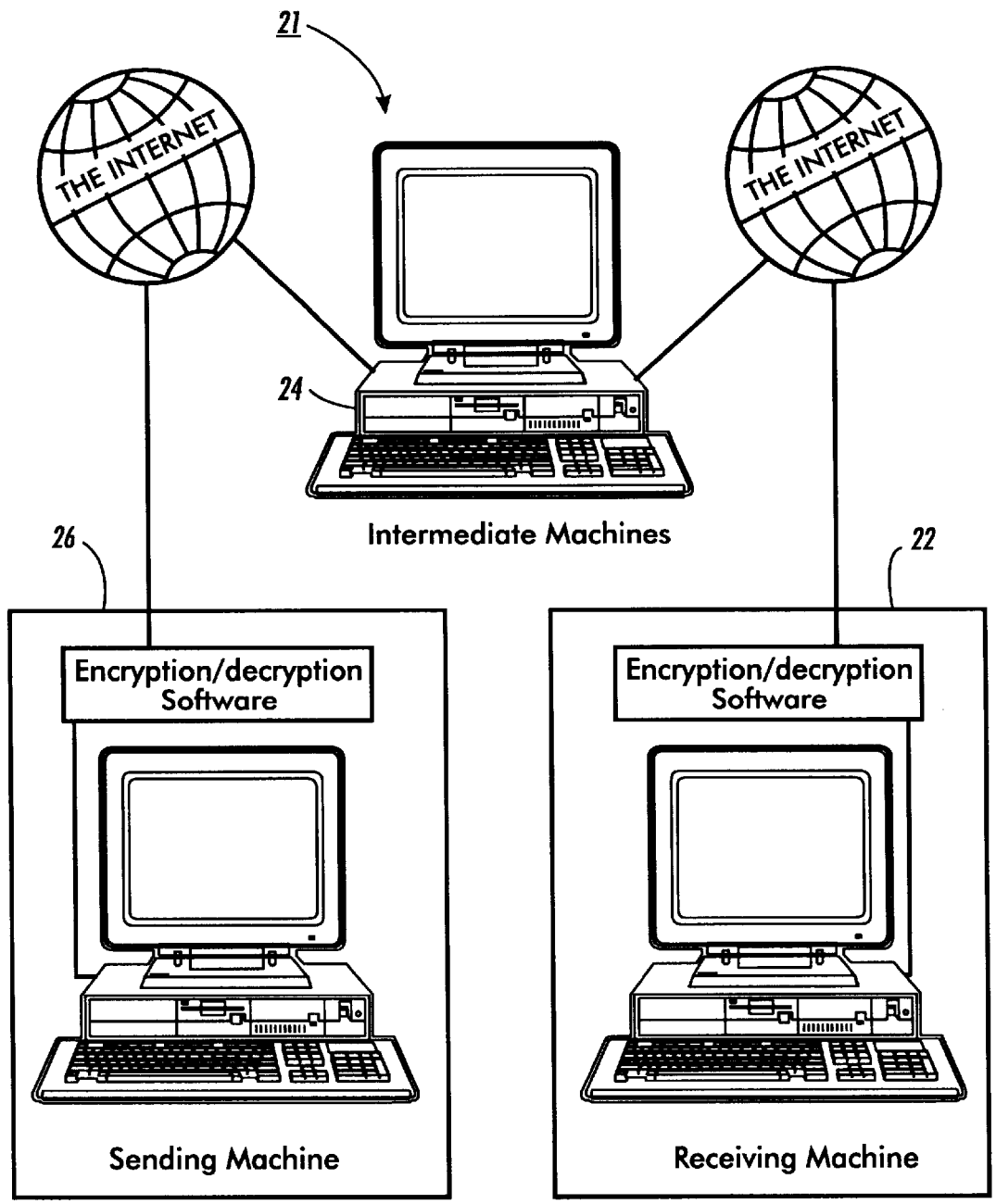
FIG. 1 schematically illustrates a network of machines.

The following definitions are helpful in understanding the broad scope of the invention, and the terms defined below have the indicated meanings throughout this application, including the claims.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media.

"Memory" is any circuitry that can store data, and may include local and remote memory and input/output devices. Examples include semiconductor ROMs, RAMs, and storage medium access devices with data storage media that they can access.

As used herein, a "query" is a criterion that can be applied to an item of data to determine whether to retrieve the item. An item of data "matches" a query if the item of data meets the query criterion. For example, the query can be a formula such as a logical combination of terms.

An operation "obtains an answer" to a query if the operation applies the query to a collection of items of data and returns a subset of the items that satisfy the query.

A "query cache" or simply a "cache" is a set of locations in memory that is used to temporarily store results of operations that obtain answers to queries so that they can be reused more rapidly to obtain answers to new queries. As long as a result is stored in a cache, it is not necessary to obtain the result again—the result can instead be retrieved from the cache. A set of locations in memory that is used in this manner "defines" a cache. Results of previous operations that are stored in a set of locations defining a cache are referred to herein as "contents" of the cache, as distinct from other information that is stored in the cache to facilitate its use.

A query cache includes contents for a "semantic region" if the cache also includes data indicating a subset of its contents, sometimes referred to as "region contents", that are the answer to a possible query. The possible query can be a formula, and the cache can also include data indicating the formula.

A semantic region is "qualified" if it meets a criterion for having or being likely to have contents that form all or part of an answer to a query.

An operation that uses a query cache to obtain an answer to a query may obtain a "query remainder", which is a more constrained query to obtain items of data not present in the cache contents but necessary to obtain an answer to the query.

A "signature file" or "signature" is an item of data that represents another item of data in a form that facilitates comparison with other signatures. For example, a signature may be a sequence of binary values, permitting comparison with other signatures of the same length by performing logical and arithmetic operations. A "query signature" is a signature representing a query. A "region signature" for a semantic region is a signature representing the possible query whose answer is the region contents. A "term signature" is a signature representing a term, which could be a term in a formula such as a query or a possible query.

An operation "combines" items of data of the same length such as equal length signatures if the operation uses the items of data to obtain a combined item of data of the same length that includes information from the items of data that were combined. For example, a logical operation such as AND-ing or OR-ing can be performed to combine binary strings.

A "network" is a combination of circuitry through which a connection for transfer of data can be established between machines. An operation "establishes a connection over" a network if the connection does not exist before the operation begins and the operation causes the connection to exist.

An "internet" is a network on which signals can be exchanged in accordance with an established internet protocol.

The invention may be implemented in any of a wide variety of systems. An implementation described below uses conventional WWW web browser software (e.g. Netscape Navigator) providing cross-platform communication and document transfer over the internet, as schematically illustrated in FIG. 1. Each machine 22, 24, 26 connected to network 21 may be a PC running Windows™, a Mac running MacOS, or a minicomputer running UNIX, which are well known in the art, or any other suitable machine running any suitable operating system. For example, a PC hardware configuration is discussed in detail in Horowitz, P., and Hill, W., *The Art of Electronics*, 2nd Ed., Cambridge University Press, 1989, Ch. 10. However, examples of different system configurations that might be used include those described in EP-A-772,857 and U.S. Pat. No. 5,692,073.

Machine 22 illustratively includes a user interface with a keyboard and a display, allowing a user to provide signals through machine 22 to other machines connected to network 22. Upon request of a user at machine 22, a signal can be sent to other machines through network 22; or machine 22 could automatically generate a signal and send it to other machines through network 22. In these and other cases, a document or other information (e.g. an answer to a query) stored on machine 26 may be retrieved and sent from machine 26 over the internet, via any number of intermediate machines, as represented by machine 24, to machine 22. As is well known, a document may be retrieved using as a unique identifier its World Wide Web Universal Resource Location (URL), obtained, for example, using a suitable query input to a search engine. The search engine query could be obtained through the user interface of machine 22 or could be automatically generated by machine 22.

Signature files, meaning files that include one or more signatures, were originally designed for the retrieval of full-text fragments containing query words. With the superimposed coding which is the most widely known, each semantic region has an associated formula in the conjunctive form. To each term in a region's formula is assigned a term signature that can be a binary sequence of ones and zeros. For a conjunction of terms such as a semantic region or a query, term signatures can be combined, such as by an appropriate bit-wise logical operation, to obtain a signature for the conjunction of terms. In the implementations described below, a region's or query's signature is generated by superimposing (bit-wise OR-ing) all term signatures generated from the region or query formula, which means that information can be transferred to a region or query signature from bits in term signatures that have the value one. If a region's or query's signature were obtained by bit-wise AND-ing term signatures, information could be transferred from bits that have the value zero. In this application, a bit in a first signature is "set" when it has a value such that information from the bit can be transferred to a second signature obtained by combining the first signature with one or more other signatures.

FIG. 2A shows an example of region signature construction, and FIG. 2B shows several sample queries, their signatures, and their relationships to the region signature from FIG. 2A.

FIG. 2A shows how a signature can be generated for the semantic region with the conjunctive formula "query∧caching". For a user query, which is also a conjunction that can be represented by a conjunctive formula, all terms have signatures, and the signature for each term can be obtained by a hash function or other appropriate operation on the term, according to conventional techniques. The term signatures can be superimposed to obtain a query signature in a way similar to the way in which signatures can be obtained for cache regions. Then, the query signature can be compared with each region signature in a signature file to obtain a partial answer and a query remainder.

Two different caching techniques set out herein work with different semantic relations between semantic regions and the query. The first caching technique, described below in relation to FIGS. 2B–6B, can handle cases of semantic containment between a query and a region, when one of them contains the other. The second caching technique, described below in relation to FIGS. 8A–9B, can also handle more frequent and complex cases of semantic intersection, when it is neither the case that a region contains a query nor vice versa.

Semantic containment can occur in three cases. In one case, a Query Q is equivalent to a semantic region R if their formulas are equivalent. In a second case, a region R contains a query Q if the region formula can be obtained from the query formula by dropping one or more terms. In this second case, referred to as "query containment", the answer to the query is a proper subset of the region contents. Inversely, in a third case, a region R is contained in a query Q if the query formula can be obtained from the region formula by dropping one or more terms. In this third case, referred to as "region containment", the answer to the query is a superset of the region contents. In any of the three cases described above, the region R is qualified as a source of answers for query Q.

Let $S_Q$ and $S_R$ denote the query signature and a region signature, respectively. With bit-wise comparison of signatures, semantic containment can be detected as follows:

Region containment, or $S_Q \subset S_R$: For each bit in the query signature set to one, the corresponding bit in the region signature is also set to one, as shown for query 2 in FIG. 2B.

In the example shown, the region for "query∧caching" from FIG. 2A is contained in the query "caching".

Equivalence, or $S_Q = S_R$: The region and query signatures have the same bits set to one, as shown for query 3 in FIG.

2B. The region for "query∧caching" from FIG. 2A is equivalent to the query "query∧caching".

Query containment, or $S_Q \supset S_R$: For each bit in the region signature set to one, the corresponding bit in the query signature is also set to one, as shown for query 4 in FIG. 2B. In the example shown, the region for "query∧caching" from FIG. 2A contains the query "Web∧query∧caching".

The above semantic containment criteria can be applied to a signature file to eliminate most, but not all regions that are not qualified as sources of answers for a query. The last query in FIG. 2B, shown as query 6, is a false drop. False drops are semantic regions whose signatures meet one of the above semantic containment criteria and thus appear to be qualified as sources of answers for the query, but the regions do not in fact contain answers to the query. Indeed, if terms "ski" and "resort" have signatures "0110 0000 1000" and "0000 0110 0001", respectively, then the signature of query "ski∧resort" is "0110 0110 1001", and, therefore, equivalent to the signature of the region "query∧caching".

False drops can be eliminated by further comparing a query with regions, but if the false drops are numerous, performance degrades. It has been proven that, to minimize the false drop probability, the expected numbers of zeros and ones in a signature must be equal. Therefore, for a given number of distinct terms in a region or query formula whose signatures generally have more ones than zeros, when the length of the signatures increases, the density of ones in the signatures decreases, and the chance of getting false drops will decrease correspondingly. However, increasing signature length will also increase storage overhead. It can be shown that, if the signature length is F bits and t is the maximal number of terms in a query, the optimal number $k_{opt}$ of bits set to one in a term signature (according to the uniform probability distribution) can be approximated by $$k_{opt} = (F \cdot \ln 2)/t \qquad (1)$$

Equation (1) does not, however, produce the optimal number $k_{opt}$ in all cases. Therefore, an alternative technique may be used, such as performing a simulation and adjusting the relation between k and F to obtain the best relation empirically.

Figure 3:
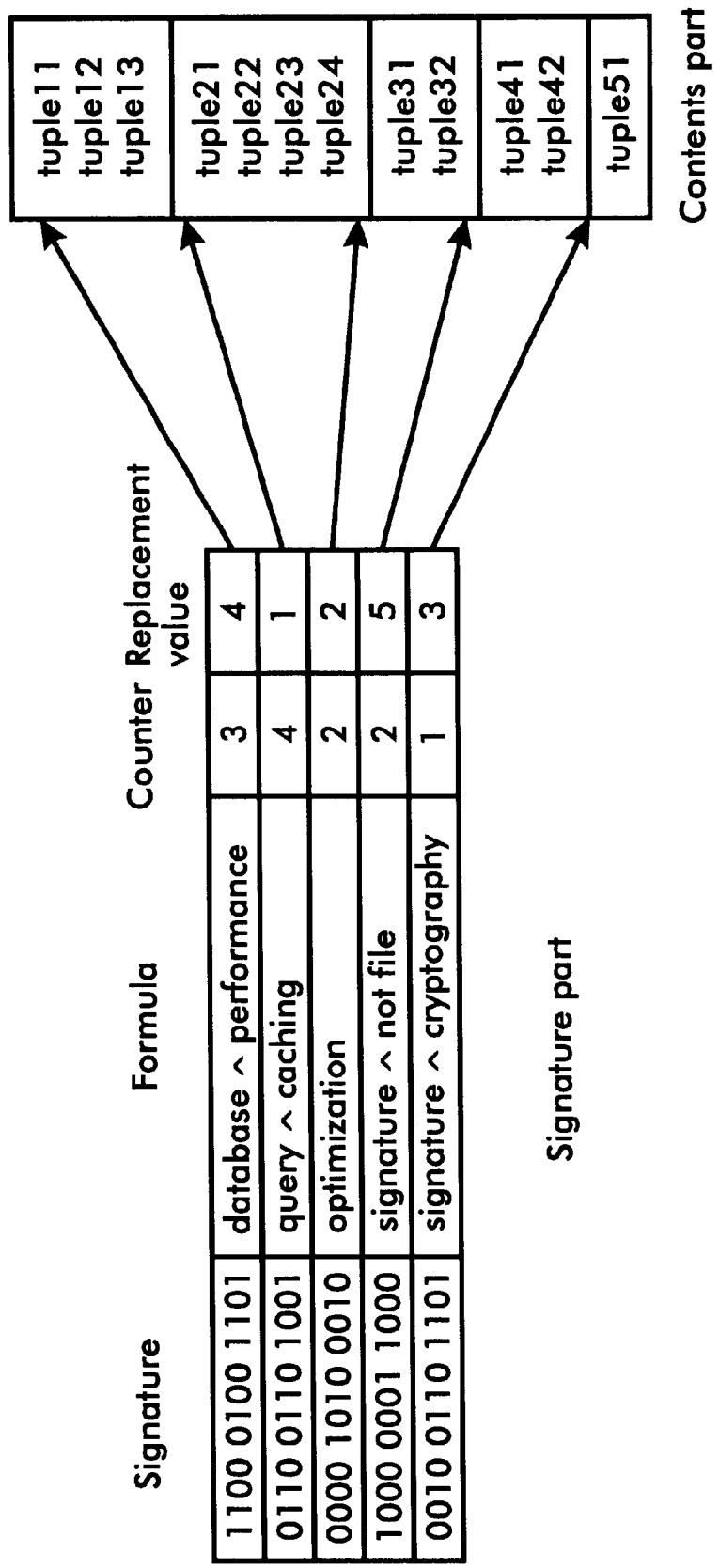
FIG. 3 schematically illustrates features of a cache architecture that includes a signature part and a contents part.

To process a query faster, a cache architecture can maintain region signatures separately from region contents, as shown in FIG. 3. The cache in FIG. 3 includes two parts, each including a set of locations defined in memory. The signature part, shown at left, includes cache entries, each including information for a respective semantic region; in general, the cache has a fixed maximum number of entries, each with a fixed maximum size. The contents part, shown at right, includes a set of tuples for each cache entry, and the tuples for an entry provide the contents of the entry's semantic region; because the overall cache has a fixed maximum size, the contents part also has a maximum number of tuples it can contain.

Besides a signature, each region's entry in the signature part can contain the region formula, a counter of tuples that are cached for the formula, a link to the corresponding region contents (represented in FIG. 3 by an arrow), and a value of a replacement function for use in determining which cache entry to remove. Qualified regions can be detected by applying the semantic containment criteria described above to signatures in the signature part. Once a semantic region is qualified for a full or partial answer, tuples stored in the region contents and matching the query are reported to the user.

A region formula can contain both terms and negations of terms. To smoothly process queries with negations, signatures for a keyword and its negation can be related. For example, a negated term can have a signature that is a bit-wise negation of the term's signature. However, as the number k of bits set to one in a term signature is much less then the signature length F, this would result in F-k bits set to one in the negated term signature. Therefore, this solution would increase considerably the false drop probability for any region whose formula contains the negated term. To avoid this problem, a term and its negation can instead be treated as two independent terms for purposes of assigning signatures, with k bits set to one in each signature.

The first technique can process three cases of semantic containment, namely, (1) equivalence, (2) query containment, and (3) region containment. If a query is equivalent to a region in a cache, the query answer coincides with the region contents. If a region contains the query, the complete answer can be also produced from the region contents, with the query formula used as a filter. Moreover, if two or more regions contain the query, the answer can be produced from the contents of any of them. To reduce filtering overhead, an algorithm can select and filter the region whose contents include the least number of tuples. In the case of region containment, an algorithm can extract a partial answer from the region contents and generate a query remainder that is sent to the server. If several regions are contained in the query, the contents of any or all of them can be used to produce the partial answer. As the number of such regions can be large, an algorithm can select a set of m regions with the maximal number of tuples.

If no semantic containment is detected, the cache is not used and the query is sent to the server. When the answer is received, a new cache region corresponding to the query is created. If the cache has no free space for the region, one or several regions must be discarded from the cache, preferably the least valuable for future reuse. As the basic replacement strategy, the LRU ("least recently used") strategy can be used. The LRU strategy is appropriate for the Web, where the search is coupled with navigation and discovery, and a new query often is a refinement of the previous query.

With an algorithm as described above, it is useful to resolve three important issues, namely, the construction of query remainders, region coalescing, and cache region replacement.

Assume that m semantic regions, $R_1, \ldots, R_m$, are contained in a query Q. Although the query remainder $Q_r$ can be constructed as $Q_r = Q - R_1 - \ldots - R_m = Q \wedge \neg R_1 \wedge \ldots \wedge \neg R_m$, such a constraint formula, after simplification, can contain disjunctions and may not be allowed for a server which accepts conjunctive queries only. For example, for query a and the region a∧b∧c (characters from the beginning of the alphabet are used to denote keywords), the constraint formula a−a∧b∧c results in the following disjunction formula:

$$a - a \wedge b \wedge c = a \wedge \neg(a \wedge b \wedge c) = a \wedge \neg b \vee a \wedge \neg c.$$

To distinguish regions that drive a query remainder to a conjunctive form from those which do not, it is necessary to introduce a difference measure between the query and region formulas. The difference can be defined as the number of terms in the region formula that are not present in the query. This definition splits the set of regions $R_1, \ldots, R_m$ into groups, where all regions in a group have l terms of difference from the query, l=1, 2, ... In the above example, the region formula a∧b∧c has a two-term difference from query a. Note, the case l=0 is also possible, and occurs when the query and region are equivalent or the region contains the query, and, therefore, the query remainder is null.

The difference measure helps us to establish that the regions with one-term difference preserve the conjunctive form of the query remainder, the following result holds:

(Remainder Construction) Assume the cache contains m regions whose formulas have one-term differences, say $a_1, a_2, \ldots a_m$, from query formula Q. Then, the query remainder $Q_r$ is $Q \wedge \neg a_1 \wedge \neg a_2 \wedge \ldots \wedge \neg a_m$.

Figure 4A:
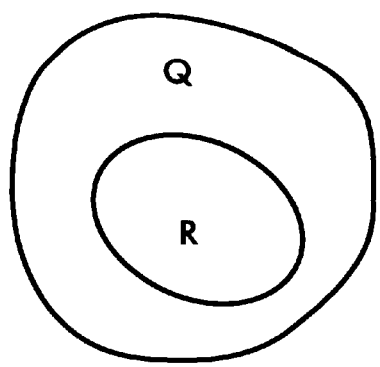
FIGS. 4A–4D illustrate semantic containment cases, with FIG. 4A showing single region containment.
Figure 4B:
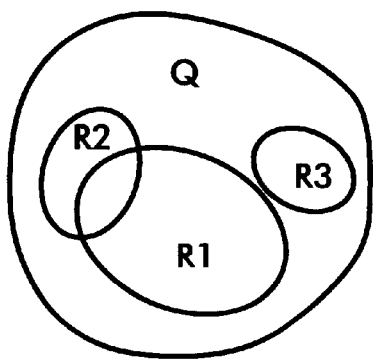
Figure 4C:
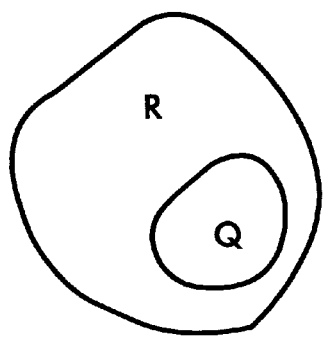
Figure 4D:
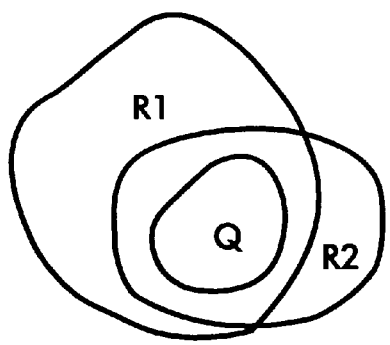

FIGS. 4A–4D illustrate semantic containment cases: FIG. 4A illustrates single region containment; FIG. 4B multiple region containment; FIG. 4C single query containment; and FIG. 4D multiple query containment.

In the cases of single or multiple query containment and equivalence, the query remainder is null. Consequently, the query can be processed locally and cache contents can be kept unchanged. A replacement value for the region providing the query answer can be updated, as described below.

In the single region containment case, illustrated in FIG. 4A, the query remainder is not null, and, moreover, it is a complement to a semantic region R. When the answer to the query remainder $Q_r$ is received, there are two modes to add the answer to the cache. With the no-coalescing strategy, a new cache region can be created for the query remainder. With the coalescing strategy, no new region is added; instead, region R's contents are extended by adding the answer to the remainder and the region formula R is replaced by Q, thus relaxing the region formula. Both above solutions occupy the same cache space to store tuples, but the coalescing strategy is preferable as it uses only one region while the no-coalescing strategy uses two.

If m semantic regions, $R_1, \ldots, R_m$, yield multiple region containment, illustrated in FIG. 4B, the advantage of the coalescing strategy is even larger. The query remainder $Q_r = Q - R_1 - \ldots - R_m$ is the complement of the union of the regions and the coalescing strategy will keep one region only (with formula Q), instead of regions $R_1, \ldots, R_m$ and the query remainder. As regions $R_1, \ldots, R_m$ can contain tuple duplications, the coalescing strategy provides better storage utilization in both signature and contents parts of the cache.

As the cache size is limited, the cache management process may discard the least recently used regions to free space for a new region. The standard LRU strategy, designed for replacement of pages of tuples in the cache, handles items of the same size, and one page or tuple is the replacement unit which can either match or not match a query.

In query caching, the situation is different. If region R is qualified as a source of an answer for a query, the answer may be obtained from the region contents in different ways. If the query contains the region as in FIG. 4A, the region contents are completely involved in responding to the query as all tuples from the region contents appear in the answer. In contrast, if the region contains the query as in FIG. 4C, the region contents are only partially involved as only some of the region tuples match the query.

Therefore, the replacement function should take into account the region involvement in the query answer. If the region contents are completely involved, the new replacement value for the region can be "the most recent one", the same as in the case when the query answer is received from the server. If the region contents are only partially involved, and there are tuples in the region contents not matching the query, the change of the replacement value toward "the most recent one" can depend on how large the portion of the matched tuples is. The region involvement can be measured as $p = T_R/T$, where $T_R$ is the number of tuples from R's contents that appear in the query answer and T is the total number of tuples in R's contents.

Without loss of generality, "the most recent value", $V_{top}$, can be increased by one each time a new query is issued. If the current replacement value of region R is $V_R$, $V_R < V_{top}$, and the region involvement is p, we calculate a new replacement function as $V_R' = V_R + (V_{top} - V_R) \cdot p$. If p=1, then $V_R' = V_{top}$. If p=½, then $V_R' = (V_{top} + V_R)/2$. Note that this replacement function can be implemented to any region in the cache, whether qualified for the query or not. If a region is not qualified for the query and therefore its involvement p is zero, the region replacement value does not change.

Figure 5A:
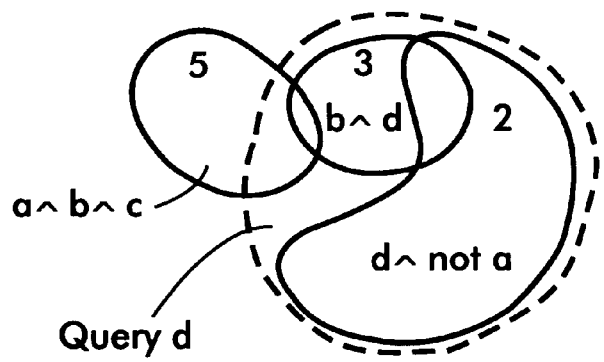
FIGS. 5A and 5B are Venn diagrams showing a region coalescing example, with FIG. 5A showing multiple region containment between a query and two regions and with FIG. 5B showing the two regions coalesced into a region equivalent to the query.
Figure 5B:
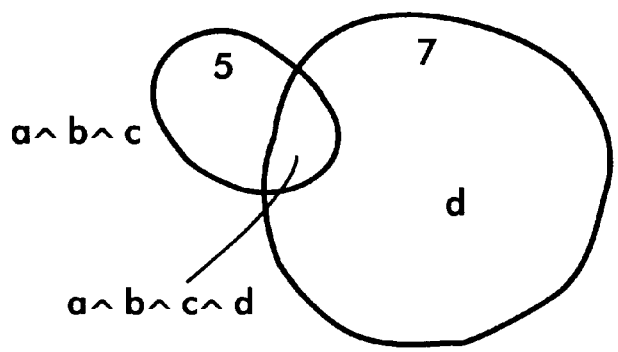
Figure 5C:
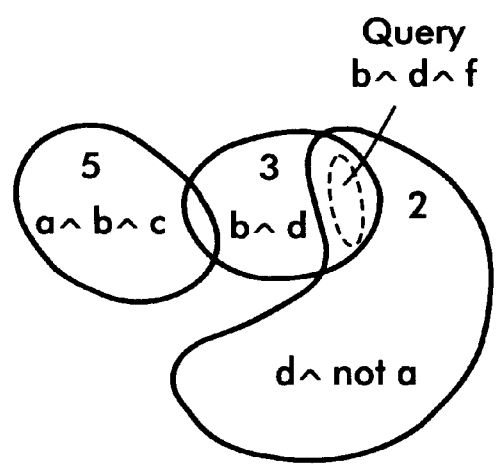
FIGS. 5C and 5D are Venn diagrams showing a replacement value updating example, with FIG. 5C showing multiple query containment between a query and two regions and with FIG. 5D showing regions with updated replacement values.

FIGS. 5A–5D depict region coalescing and updating examples: In FIG. 5A, query Q=d is issued, and in FIG. 5B, regions are coalesced after the query. In FIG. 5C, query Q=b$\wedge$d$\wedge$f is issued, and in FIG. 5D, regions are updated after the query.

The cache initially contains three regions with formulas (1) a$\wedge$b$\wedge$C, (2) b$\wedge$d, and (3) d$\wedge\neg$. FIG. 5A shows the regions with their replacement values (assuming $V_{top}$=6). If a new query is received with the formula d, the second and third regions both meet the criterion for region containment. As both region formulas differ from the query formula in one word only (b for the second region and $\neg$a for the third one), the query remainder generated will be d$\wedge$a$\wedge\neg$b. Once the complete answer is produced, the second and third regions and the query reminder can be replaced by one region with formula d, as shown in FIG. 5B. The replacement value of the new region can be $V_{top}$=7, one greater than the previous replacement value.

Figure 5D:
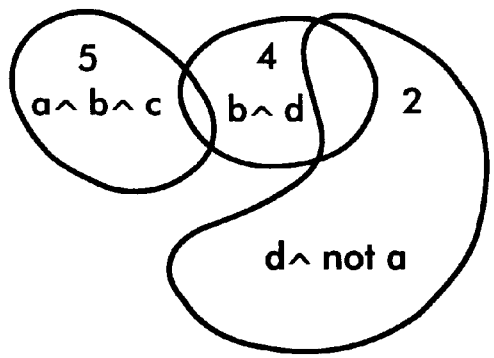

FIG. 5C shows the same three regions and replacement values as FIG. 5A, but a query is received with the formula b$\wedge$d$\wedge$f. The second and third regions, b$\wedge$d and d$\wedge$a, meet the criterion for query containment. The second region could, for example, be selected to obtain an answer to the query because it has less tuples in its contents than the third region. The second region's replacement value can be updated (illustratively from 3 to 4, as shown in FIG. 5D) according to the portion of tuples matching the query in the region contents, such as by using the calculation described above.

Figure 6A:
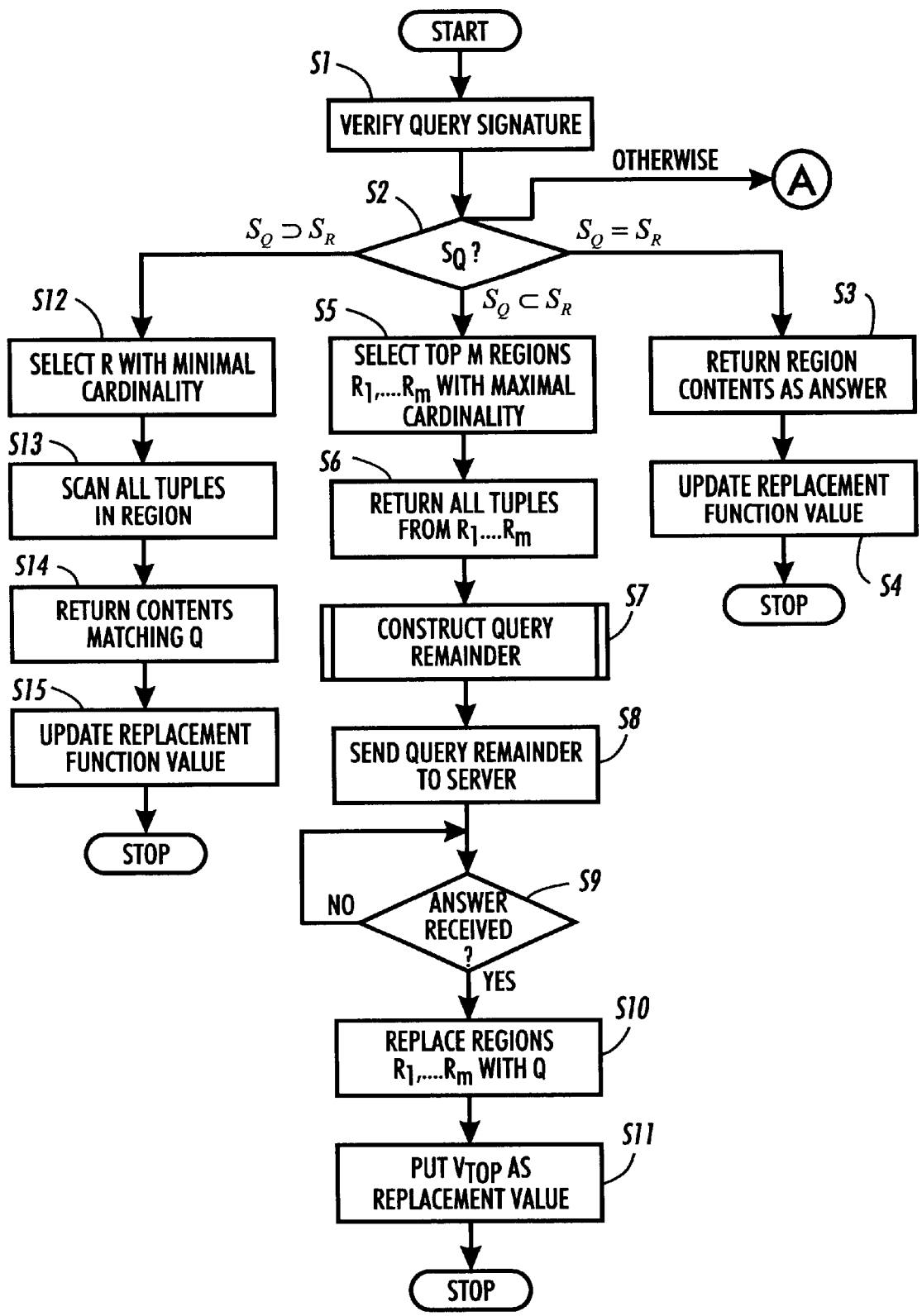
FIGS. 6A to 6C form a flow chart illustrating caching according to a first technique.
Figure 6B:
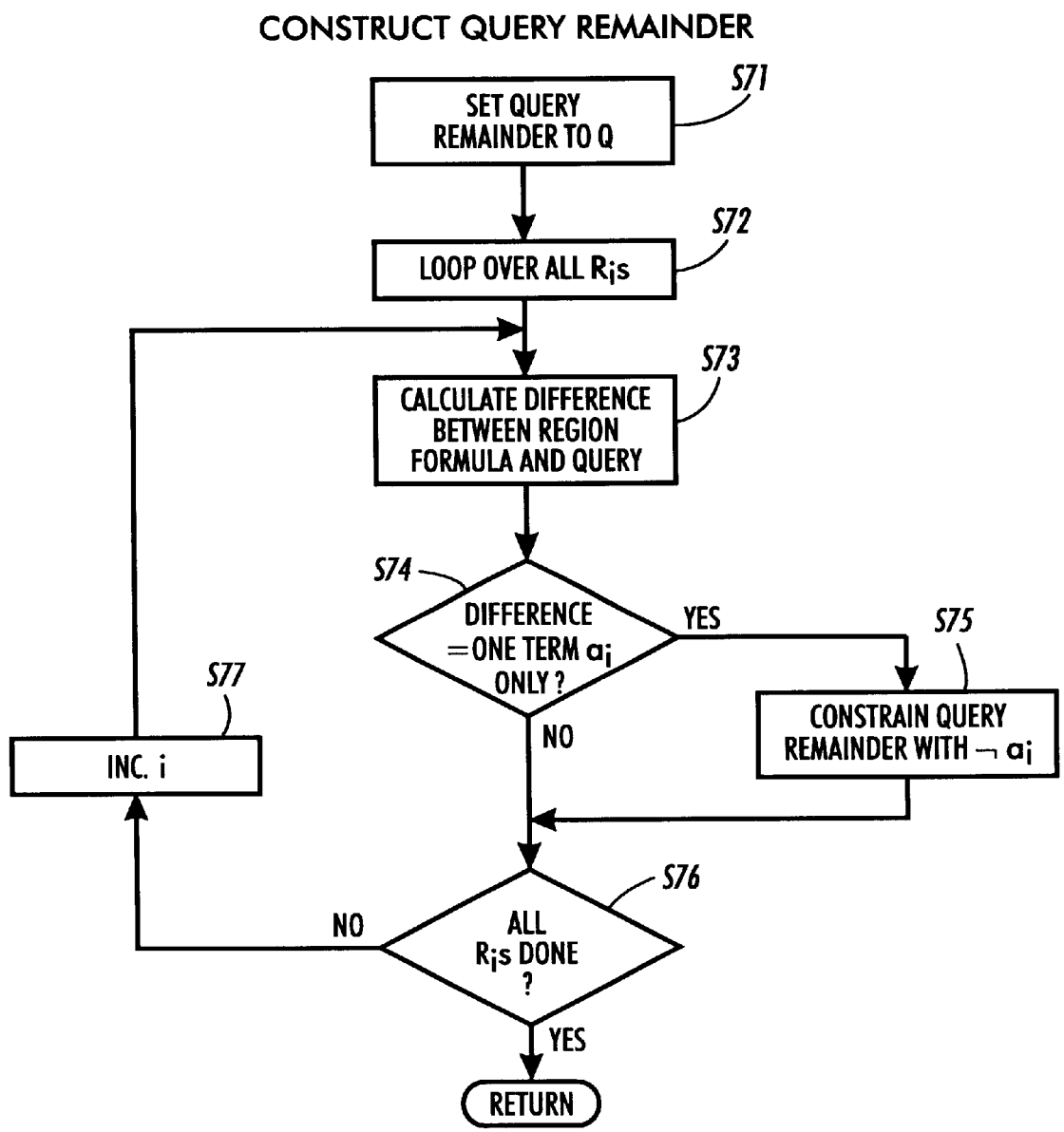
Figure 6C:
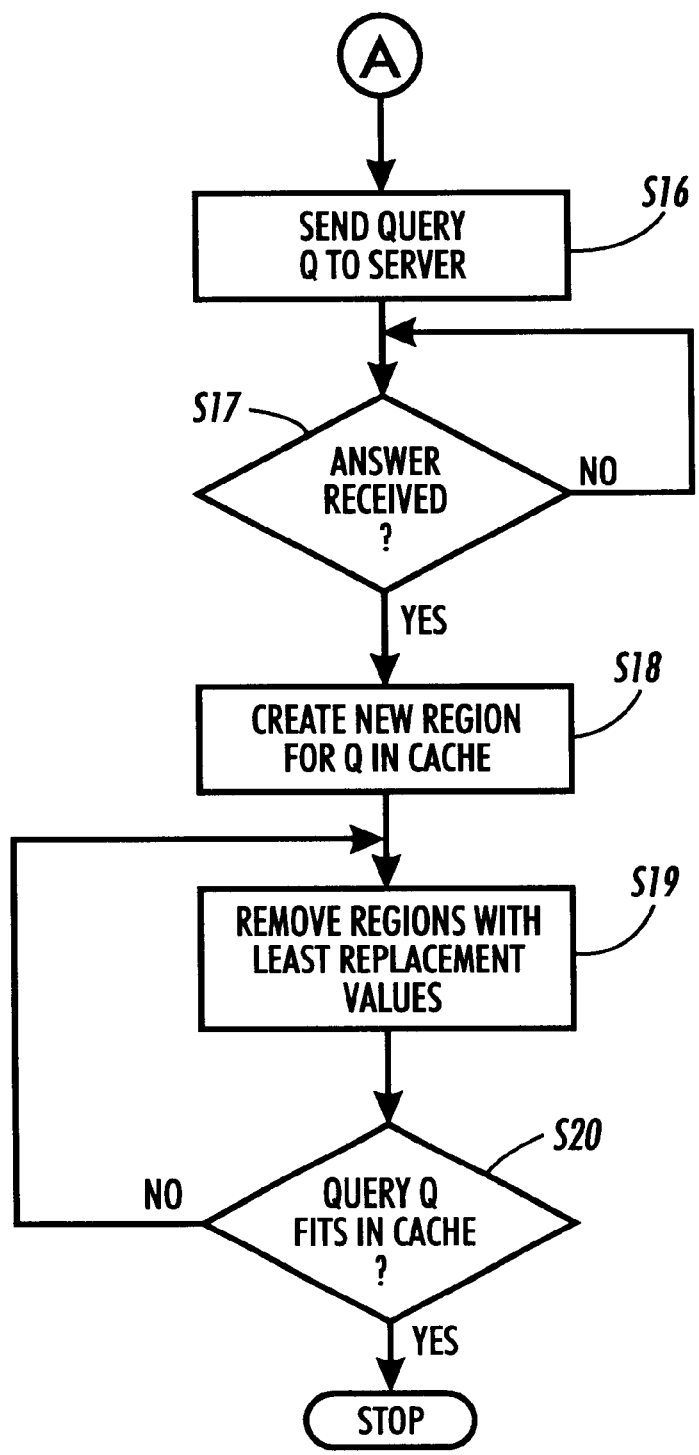

FIGS. 6A to 6C illustrate an implementation of caching according to the first technique. The cache management operations in FIGS. 6A–6C can be performed in response to a query by the central processing unit (CPU) of a user's machine, such as machine 22 in FIG. 1. The cache management operations can be initiated once a query has been received through the machine's user interface. The operations can begin with the query formula Q and a handle for use in accessing the cache in memory. The operations can prepare to respond to the query by incrementing the previous value of $V_{TOP}$. In general, the cache management operations respond to the query by updating the cache and returning an answer to Q.

The cache management operations can be described in terms of five groups of operations, as follows:

1. The act in box S1 in FIG. 6A verifies or compares the query signature against all region signatures in the cache, applying the semantic containment criteria described above. Then, the act in box S2 branches based on the result, following the branch to box S3 if all the semantic containment criteria are met and following the branch labeled "A", illustrated in FIG. 6C, if none of the semantic containment criteria is met.

2. $S_Q = S_R$: If there is a region whose formula is equivalent to the query, the act in box S3 returns the region contents as the query answer. The act in box S4 then updates the replacement function value of the region, after which the operations stop.

3. $S_Q \supset S_R$: If one or more regions contain the query but the query is not equivalent to any region, the act in box S12 chooses the region with the minimal cardinality, meaning the smallest count of tuples. The act in box S13 scans the tuples in the selected region's contents to find those that match the query and the act in box S14 returns ones matching the query. The act in box S15 updates the replacement function value of the selected region, after which the operations stop.

4. $S_Q \subset S_{Ri}$: If one or more regions are contained in the query but the query is not equivalent to any region, the act in box S5 chooses the top m regions, $R_1, \ldots, R_m$, with the maximal cardinality, where m is typically the number of regions that are contained in the query, and where maximal cardinality means the largest tuple counts. The act in box S6 returns all tuples from the region contents of $R_1, \ldots, R_m$, after discarding duplications. The act in box S7, which can be implemented as described below in relation to FIG. 6B, constructs a query remainder, and the act in box S8 sends the query remainder from box S7 to a server, such as machine 26 in FIG. 1. The act in box S9 performs a loop, such as a timed loop, that waits until an answer to the query remainder is received from the server. When the answer is received, the act in box S10 uses the answer to replace regions $R_1, \ldots, R_m$ with a new region whose formula is the query Q, in the manner described above in relation to FIG. 5B. The act in box S11 sets the new region's replacement function value to $V_{TOP}$, after which the operations stop.

The act in box S7 can be implemented by a call to a subroutine as shown in FIG. 6B. In response to the call, the act in box S71 can set the query remainder to query Q. Then the act in box S72 can set up an iterative loop each iteration of which handles one of the regions $R_1, \ldots, R_m$, For each region $R_i$, the act in box S73 calculates the difference between the region formula and the query. If the act in box S74 determines that the difference is one term $a_i$ only, the act in box S75 constrains the query remainder with $\neg a_i$, which can be done by conjoining the previous query remainder and an additional term $\neg a_i$. If the difference is more than one term, no further constraint is added to the query remainder for that region, because only conjunctive queries and query remainders are allowed in this implementation. If the act in box S76 determines that regions remain to be handled, the act in box S77 increments i for the next iteration. When the act in box S76 determines that all regions have been handled, the query remainder is returned.

5. If none of the semantic containment criteria are met, the act in box S16 in FIG. 6C sends query Q to the server. The act in box S17 performs a loop, such as a timed loop, that waits until an answer to the query is received from the server. When the answer is received, the act in box S18 creates a new region for Q in the cache. If it is necessary to free space for the region, the act in box S19 removes the region with the least replacement values, and the act in box S20 determines whether query Q fits the cache; if not, the act in box S19 is repeated until the act in box S20 determines that the new region for query Q fits. After the new region has been stored in the cache, the operations stop.

The first caching technique described above in relation to FIGS. 2B–6C efficiently manages the semantic containment cases. However, it does not manage more frequent but more complex cases of semantic intersection, which occur when a semantic region can produce a portion of the answer, but it neither contains nor is contained in the query. The first caching technique performs the acts in FIG. 6C whenever semantic intersection occurs without any of the semantic containment criteria being met, and the acts in FIG. 6C do not make use of cached contents.

Figure 7A:
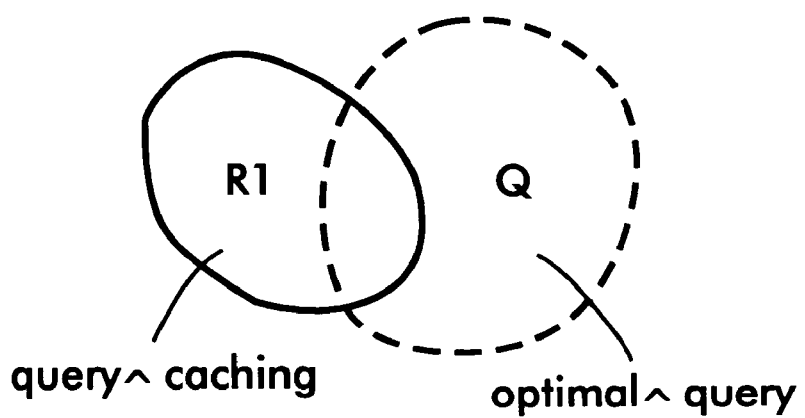
FIG. 7A is a Venn diagram that shows a semantic intersection example.
Figure 7B:
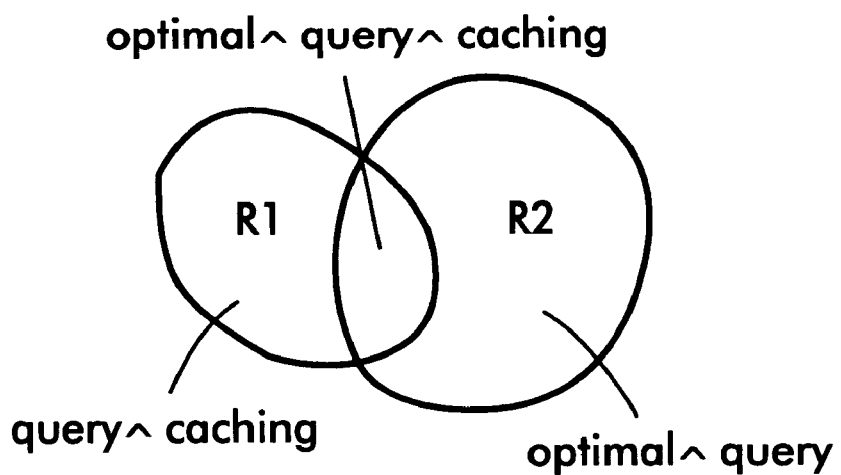
FIG. 7B is a Venn diagram that shows regions in memory if the example of FIG. 7A were handled by the technique in FIGS. 6A to 6C.

FIGS. 7A and 7B show a semantic intersection example. As shown in FIG. 7A, the cache contains region $R_1$ with formula "query∧caching" and query Q is "optimal∧query".

Since there is no semantic containment, the first caching technique described above does not exploit $R_1$ to obtain a partial answer, although any tuples in the region contents matching the formula "optimal∧query∧caching" also match the query. Moreover, when the first caching technique described in relation to FIG. 6C receives the answer to query Q from the server, it creates a new semantic region $R_2$ with the same formula "optimal∧query", as shown in FIG. 7B. Two semantic regions $R_1$ and $R_2$ contain tuple duplicates, which match their intersection formula "optimal∧query ∧caching". In other words, in the semantic intersection cases, the first technique results in low cache use and a high tuple duplication level.

FIGS. 8A–8D illustrate an implementation of a second, more advanced caching technique that, in addition to using cache contents in the containment cases, also uses cache contents in cases of semantic intersection to improve cache utilization and reduce the tuple duplications.

Intersection of a semantic region R and a query Q is given by intersection of their formulas, represented as R∩Q. Given the region signature $S_R$ and the query signature $S_Q$, their signature intersection $S_Q \cap S_R$ can be obtained by the bit-wise AND-ing of $S_Q$ and $S_R$. Then, for a signature S, the signature cardinality |S| denotes the number of bits set to one in the signature.

In the semantic intersection of a semantic region R and a query Q, we distinguish two main cases:

(1) Complement: Q∩R=Ø; the formula intersection is null. For instance, query a∧b is a complement to the region a∧¬b. Consequently, the region contains no tuples to answer to the query. However, in the complement case, region coalescing is possible. For the query and region above, coalescing would result in one region with formula a.

(2) Intersection: Q∩R≠Ø; the formula intersection is not null. There are two following sub-cases of intersection:

(2A) Query and region formulas have some common terms. For example, region "caching∧query" and query "optimal ∧query" have term "query" in common.

(2B) Query and region formulas have no common terms. For instance, region a and query b have no common terms, but their intersection a∧b is not empty, and, therefore, the region can contribute to a partial answer to the query.

If a query Q and a region R have some common terms, their signatures have bits set to one which correspond to signatures of the common terms. The more terms formulas Q and R have in common, the larger the number of bits jointly set to one, and the semantic intersection of Q and R can be measured by the number $|S_Q \cap S_R|$ of corresponding bits set to one in both signatures. However, this is not always an accurate measure of semantic intersection. For example, for a region with formula a and a query b, their signature intersection can have no bits set to one, but the region can include tuples matching the formula b∧a.

The second caching technique can be implemented in a way that allows quick detection of which regions intersected by a query can contribute to a partial answer and constrain the query remainder. Note that the following discussion about semantic intersection assumes that no equivalence or query containment is detected in the cache, and, therefore, the query remainder is not null.

As with semantic containment, not all regions having intersections with the query can contribute to the query remainder, since only conjunctive queries are allowed. To detect which regions can contribute, term differences introduced in relation to the first caching technique are used. Moreover, the remainder construction technique of FIG. 6B which was derived for the semantic containment cases can be fully applied to the semantic intersection cases. That is, if the cache contains m regions whose formulas are not contained in the query Q, but have one-term differences, say $a_1, a_2, \ldots, a_m$, the query remainder Q. can be constructed as $Q \wedge \neg a_1 \wedge \neg a_2 \wedge \ldots \wedge \neg a_m$.

As the region "caching∧query" has a one-term difference from the query "optimal∧query", the second caching technique can use the region contents to provide a partial answer that includes any tuples that match "optimal∧query∧caching" and can construct a query remainder "optimal∧query ∧caching". Similarly, the region a has one-term difference from the query b. Therefore, the second caching technique can provide a partial answer that includes any tuples in the region portion a∧b and can obtain a query remainder b∧¬a.

Because the second caching technique uses semantic regions with one-term differences from the query in constraining the query remainder, the second caching technique can be implemented with a double-scan evaluation of the query against the cache contents. The first, fast scan over the region signatures can identify all regions with one-term differences in order to quickly construct the query remainder and produce a first partial answer. The second, slow scan can check whether other intersection cases can enrich the partial answer. The two scans over the region signatures can apply different filtering functions to the region signatures.

Each region R accepted by the filtering function applied during the first scan should have at most a one-term difference from the query. Therefore, to satisfy the first scan filtering function, if the region signature has $|S_R|$ bits set to one, and its intersection with the query signature has $|S_R \cap S_Q|$ such bits, the difference between the two numbers should be at most k bits, where k is the number of bits set to one in a term signature. The following result states this criterion explicitly.

If region R has a one-term difference from query Q, then $$|S_R \cap S_Q| \geq |S_R| - k \qquad (2)$$

The first scan applies the criterion (2) to the region signatures. If a region signature meets criterion (2), the region formula is checked for a one-term difference. As in the first technique for semantic containment cases, a false drop happens if criterion (2) is met but the region formula does not provide a one-term difference. A number of experiments have been conducted and it has been found that the number of false drops when applying criterion (2) can be kept small by the appropriate choice of $k_{OPT}$, calculated with formula (1), or a value of k obtained empirically as described above.

The second scan applies a different filtering function to detect regions whose formulas have two or more different terms from the query and can not constrain the query remainder. By analogy with the case of a one-term difference, a region R whose formula has I terms of difference from the query, where $I \geq 2$, would be expected to satisfy the criterion $$|S_R \cap S_Q| \geq |S_R| - k \cdot l \qquad (3)$$

However, criterion (3) is not always useful for the second scan. First, criterion (3) becomes less informative for increasing values of k. In fact, a typical Web query or region formula has an average of three or four terms, and the criterion (3) is often reduced to a simple $|S_R \cap S_Q| \geq 0$, which would accept all the region signatures, resulting in a large number of false drops and a high filtering overhead. Second, regions having two or more terms of difference from the query usually contribute much less to the answer than regions with a one-term difference. Third, the tuples contributed by regions with two or more terms of difference will be duplicated in the answer to the query remainder, as their formulas were not excluded from the remainder.

In view of these problems, only two criteria for the second scan are likely to be useful:

(1) $|S_R \cap S_Q| \geq |S_R| - 2k$ this criterion is met mainly by regions with two-term differences from the query. Therefore, some regions having more terms of difference will not meet the criterion.

(2) $|S_R \cap S_Q| \geq 0$: all region formulas satisfy this criterion; therefore, it yields numerous false drops. However, it retrieves all tuples in the cache matching the query.

In most cases, the first of these criteria is preferable as it provides a good tradeoff between the number of false drops and the number of tuples retrieved. The second criterion can be used if the cache is small or the application should retrieve all cached tuples that match the query.

In the semantic intersection case, the technique for coalescing regions described above can be extended. The extended technique can coalesce the query and a region, but only if their unified formula is a conjunction. For instance, it can coalesce query a∧b and the region a∧¬b in one region, because their unified formula is simply a. The extended technique can be implemented to coalesce a region and a query only if three conditions hold: 1) the region has a one-term difference, say $a_1$, from the query; 2) symmetrically, the query has one term difference, say $a_2$, from the region; 3) $a_1$ is a negation of $a_2$. Obviously, such a situation can be detected by applying the above criterion (2) and, when it is detected, the region and the query can be coalesced.

The replacement policy described above for the semantic containment case can also be used for the semantic intersection cases. When a new query is received, the replacement value of every semantic region in the cache can be updated, toward to $V_{top}$, proportionally to the region involvement in the answer.

The second caching technique can cover both the semantic containment cases discussed in relation to the first caching technique and the semantic intersection cases. Moreover, the second caching technique does not distinguish between regions with query containment and regions with semantic intersection, but rather processes them uniformly to identify those with one-term differences.

FIGS. 8A to 8D illustrate some operations that can be performed in implementing caching according to the second technique. The cache management operations in FIGS. 8A–8D can be performed in response to a call as described above in relation to FIGS. 6A–6C. In general, the cache management operations respond to the call by updating the cache and returning an answer to Q.

The cache management operations can be described in terms of four groups of operations, as follows:

1. The act in box S21 in FIG. 8A performs a first scan, checking the query signature against the region signatures in the cache and applying a set of criteria that includes semantic intersection criterion (2) above. The act in box 22 then branches based on the result from box S21, following the branch to box S23 if an equivalence criterion is met; following the branch to box S25 if a query containment criterion such as $S_Q \cap S_R = S_Q$ is met but the equivalence criterion is not met; following the branch to box S29 if neither the equivalence criterion nor the query containment criterion is met but criterion (2) is met; and following a default branch (not shown) like the one labeled "A" in FIG. 6A and illustrated in FIG. 6C if none of the criteria is met.

2. $S_Q = S_R$: If there is a region whose formula is equivalent to the query, the act in box S23 returns the region contents as the answer. The act in box S24 updates the replacement value of the region, after which the operations stop.

3. $S_Q \cap S_R = S_Q$: If the equivalence criterion is not met but the query containment criterion indicates that one or more regions contain the query, the act in box S25 selects the region with the minimal cardinality, meaning the smallest count of tuples. The act in box S26 scans the region contents to find tuples that match the query and the act in box S27 returns any tuples matching the query. The act in box S28 updates the replacement value of the region, after which the operations stop.

4. $|S_Q \cap S_R| \geq |S_R| - k$: If neither the equivalence criterion nor the query containment criterion is met by any region, but criterion (2) is met, the act in box S29 identifies all regions, say $R_0, \ldots, R_m$, $m \geq 0$, that meet criterion (2) and that also have a one-term difference from the query. The regions identified in box S29 will include any instances of region containment in which the contained region has a one-term difference from the query. The act in box S30 returns any tuples matching the query in regions $R_0, \ldots, R_m$, discarding duplications, thus obtaining a partial answer. The act in box S31 constructs a query remainder $Q_r = Q \wedge \neg R_0 \ldots \wedge \neg R_k$ as described below in relation to FIG. 8B. The act in box S32 sends the query remainder from box S31 to a server. The act in box S33 performs a second scan, scanning region signatures with a criterion T as described below in relation to FIG. 8C. The act in box S34 performs a loop, such as a timed loop, that waits until an answer to the query remainder is received from the server. When the answer is received, it can be used to obtain and return a complete answer. The act in box S35 also uses the answer to update the cache, as described below in relation to FIG. 8D. The act in box S36 updates replacement values for all the regions that contributed to the partial answer, after which the operations stop.

Figure 8A:
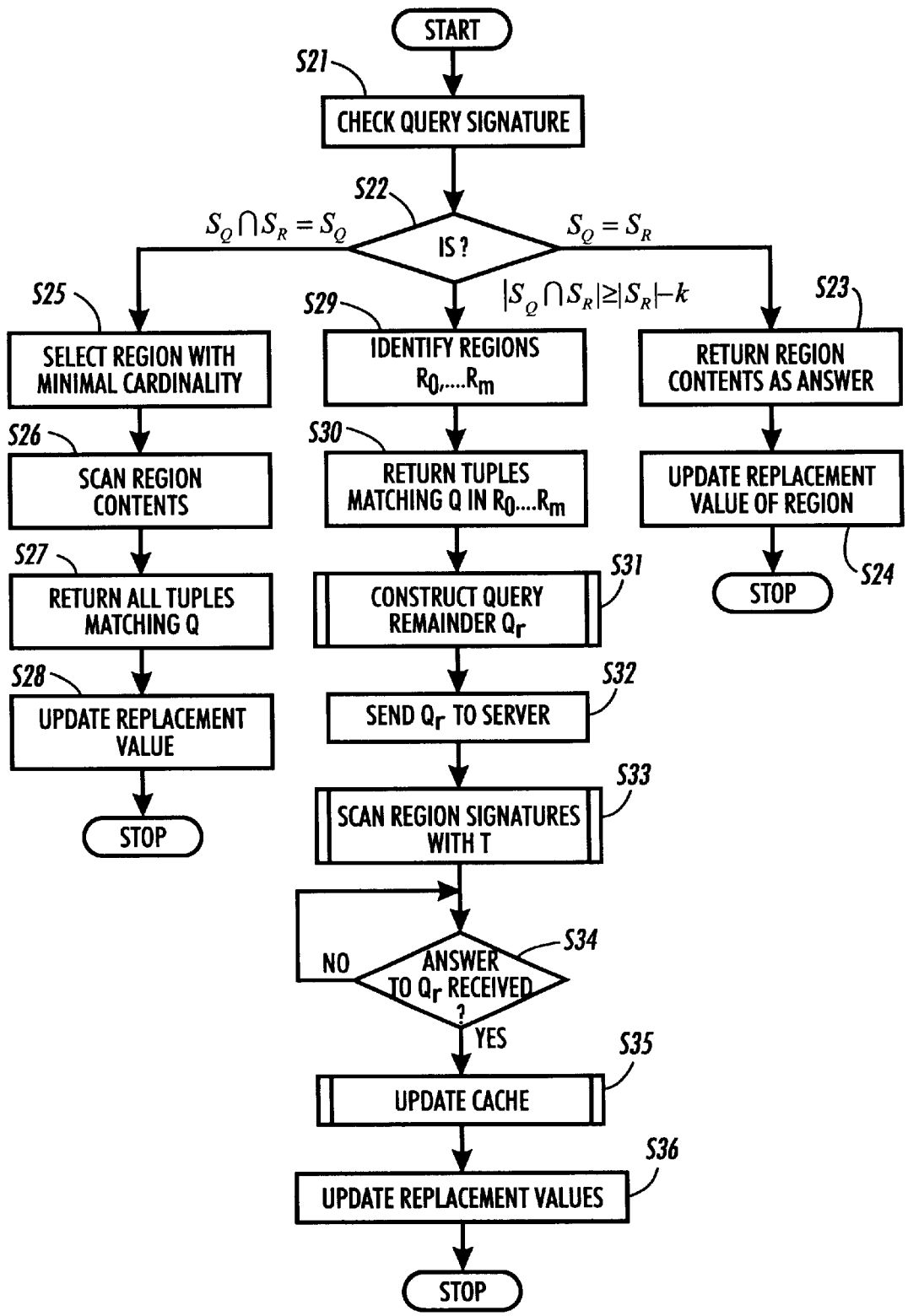
FIGS. 8A to 8D form a flow chart illustrating caching according to a second technique.
Figure 8B:
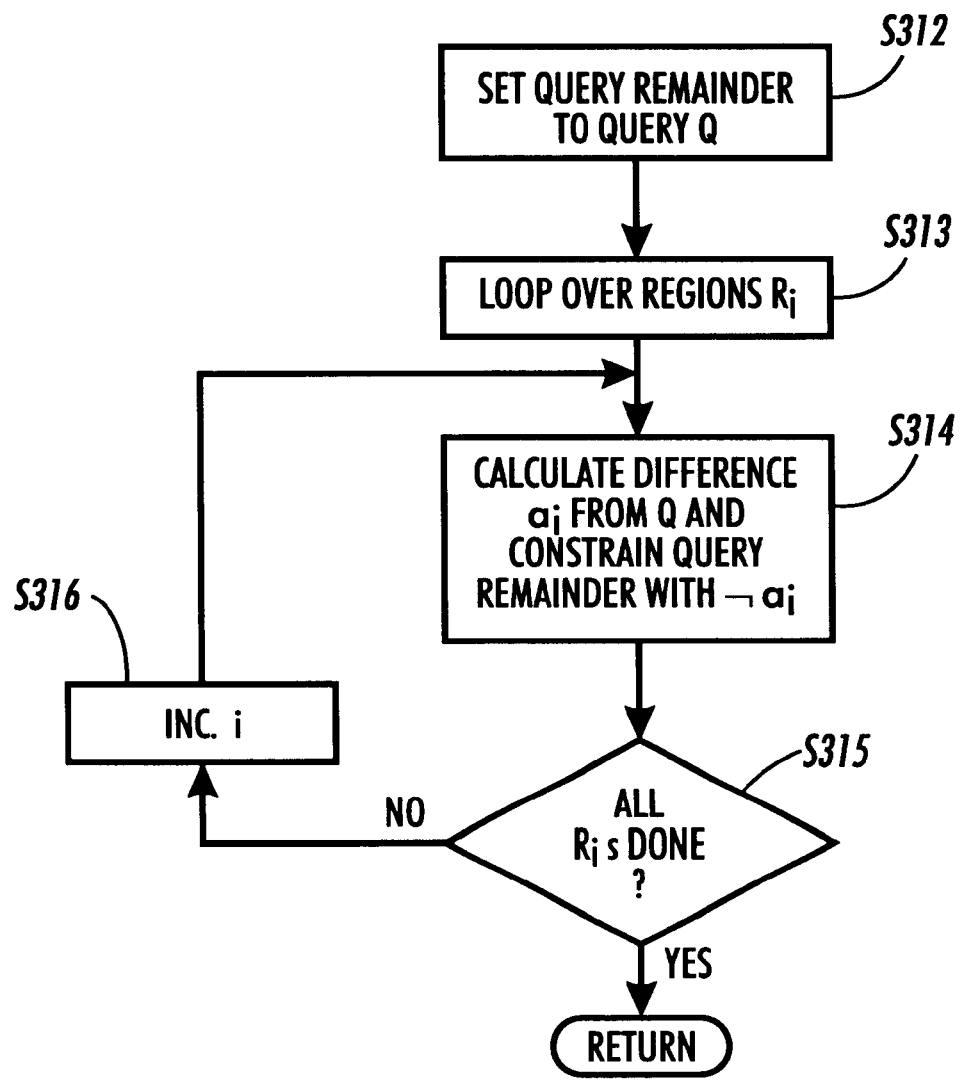

The act in box S31 can be implemented by a call to a subroutine as shown in FIG. 8B. In response to the call, the act in box S312 sets the query remainder to query Q. The act in box S313 can set up an iterative loop each iteration of which handles one of the regions $R_1, \ldots, R_m$. For each region $R_i$, $i=0, \ldots, m$, the act in box S314 can calculate the difference $a_i$ from the query and constrain the query remainder with $\neg a_i$, which can be done by conjoining the previous query remainder and an additional term $\neg a_i$. If the act in box S315 determines that regions remain to be handled, the act in box S316 increments i for the next iteration. When the act in box S315 determines that all regions have been handled, the query remainder is returned.

Figure 8C:
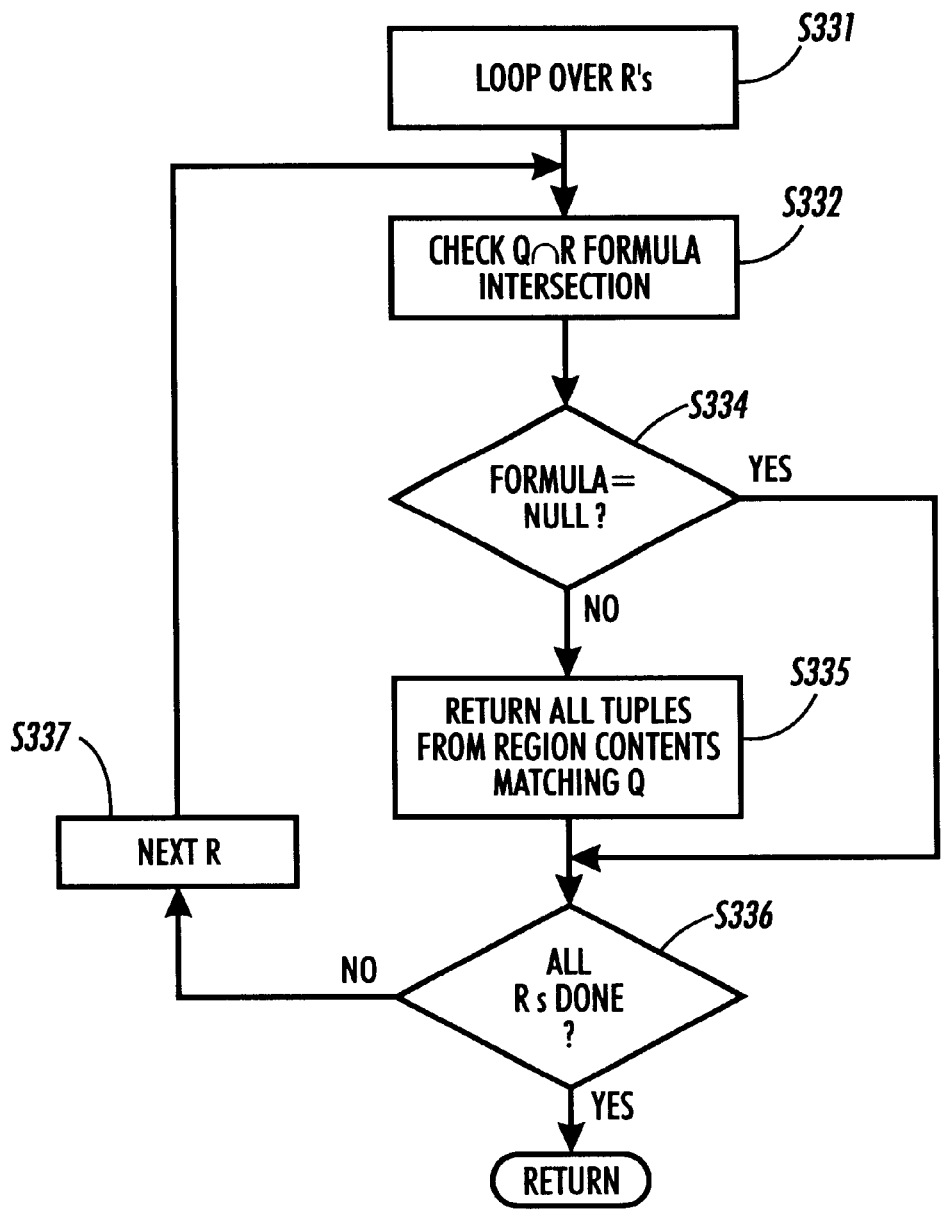

The act in box S33 can be implemented by a call to a subroutine as shown in FIG. 8C. In response to the call, the act in box S331 can set up an iterative loop each iteration of which handles one of the regions in the cache, thus performing the second scan, scanning the region signatures with a condition T, where T can be a choice between $|S_R| - 2k \leq |S_R \cap S_Q| < |S_R| - k$, chosen if $|S_R| - 2k > 0$, and $0 \leq |S_R \cap S_Q| < |S_R| - k$, chosen if $|S_R| - 2k \leq 0$. If the chosen criterion is met, the condition T is satisfied. For each region R, the act in box 332 checks the $Q \cap R$ formula intersection by applying condition T. If the act in box S334 determines that the formula is not null, meaning that the intersection satisfies condition T, the act in box S335 returns all tuples from the region contents matching the query. If the act in box S336 determines that regions remain to be handled, the act in box S337 advances to the next region for the next iteration. When the act in box S336 determines that all regions have been handled, the subroutine returns.

Figure 8D:
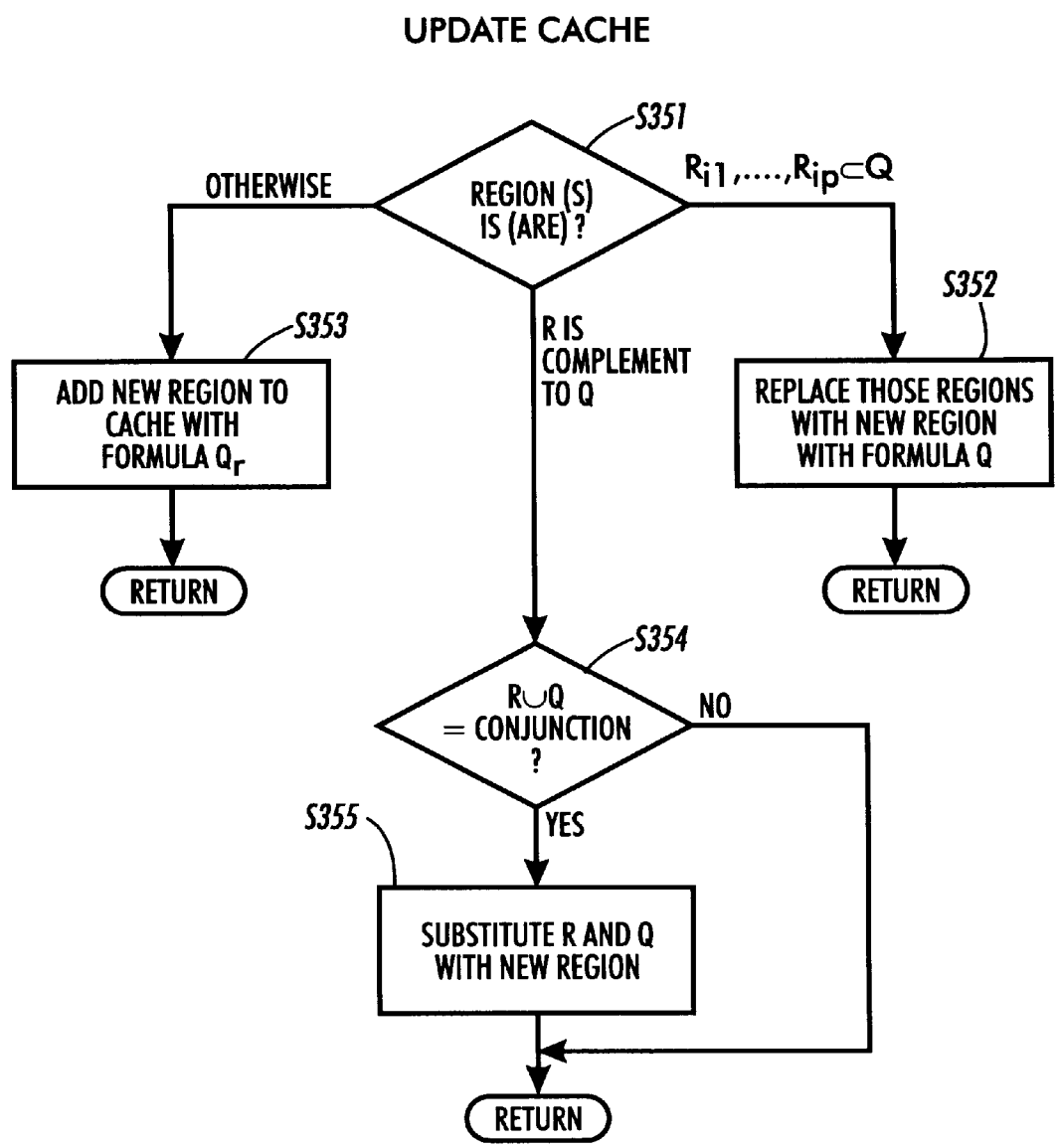

When the answer to the query remainder $Q_r$ is received, the act in box S35 can update the cache by a call to a subroutine as shown in FIG. 8D. In response to the call, the act in box S351 can branch based on the relationship between the query and the regions with a one-term difference from box S29. If the regions $R_{i1}, \ldots, R_{ip}$ are contained in the query, the act in box S352 replaces the regions with a new region with formula Q. Whether the act in box S352 is performed or not, if any one of the regions R is a complement of query Q and if the act in box S354 determines that the formula R#Q simplifies to a conjunction, the act in box S355 replaces R and a with a new region that has the formula R#Q. Otherwise, if neither of the other branches is taken, the act in box S353 performs the default operation, adding a new region to the cache with the formula $Q_r$.

Figure 9A:
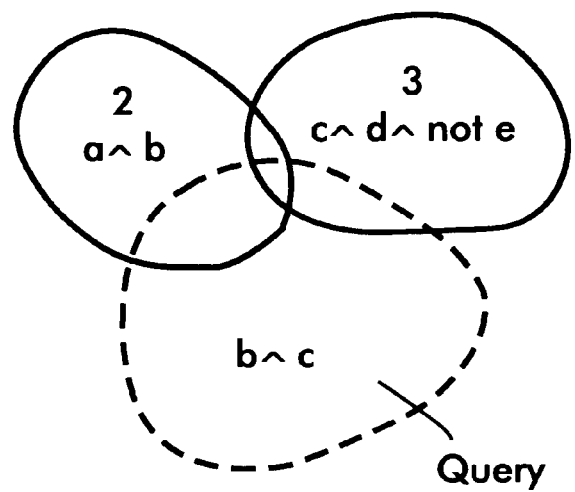
FIGS. 9A and 9B are Venn diagrams that illustrate region coalescing for semantic intersection, with FIG. 9A showing semantic intersection between a query and two regions and FIG. 9B showing regions in memory resulting from the technique in FIGS. 8A to 8D.
Figure 9B:
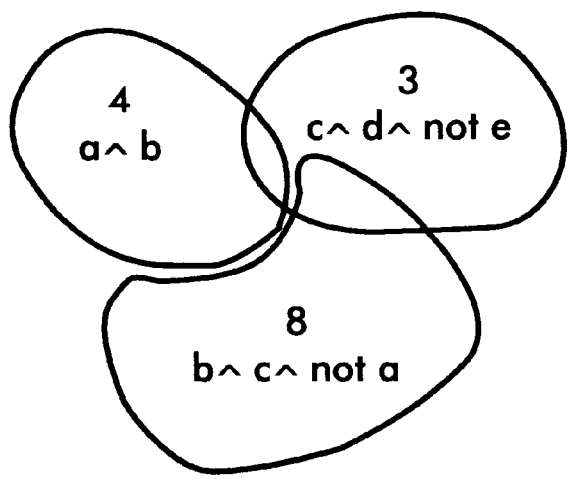

FIGS. 9A and 9B illustrate region coalescing for a semantic intersection case. FIG. 9A shows a cached set of regions when a query $b \wedge c$ is received, and FIG. 9B shows a resulting cached set of regions after a response to the query has been provided.

In FIG. 9A, the cached regions have the formulas $a \wedge b$ and $c \wedge d \wedge \neg e$ and the query is $b \wedge c$. The regions also have respective replacement values of 2 and 3 and $V_{top} = 7$. The first scan detects that the region $a \wedge b$ has one-term difference from the query and can constrain the query remainder Q. which is $b \wedge c \wedge a$. All tuples from the region contents matching the query can be used in obtaining the partial answer. The second scan detects the semantic intersection for region $c \wedge d \wedge e$. The region contents are scanned and tuples matching the query can be used in completing the partial answer.

Once the answer to the query remainder $Q_r$ is received, a new region with the formula $b \wedge c \wedge \neg a$ is created with the replacement value equal $V_{top} = 8$, as shown in FIG. 9B. Also, both $a \wedge b$ and $c \wedge d \wedge \neg e$ have their replacement values updated to 4 and 3 respectively, proportionally to their contribution to the answer.

Variations

The implementations described above could be varied in numerous ways within the scope of the invention.

The implementations described above have been successfully executed on Sun SPARCstation workstations, but implementations could be executed on other machines.

The implementations described above have been successfully executed using the Java programming environment on Sun SPARCstation, Solaris 2.5.x platform, but other programming environments and platforms could be used.

In the implementations described above, a single user's machine maintains a query cache for the user, but the invention could be implemented in various other architectures in which queries from a number of sources at any point from the sources of the queries to the servers or other information sources that respond to the queries.

The implementations described above cache Web conjunctive queries received through a machine's user interface, but the invention could be implemented in various other query caching contexts, including more complex implementations in which queries are not purely conjunctive and including contexts in which queries are automatically produced or are received from other sources and, when they cannot be answered from cache, are provided on a network other than an internet or intranet or are provided to information sources through connections other than a network.

The implementations described above produce and combine signatures that are binary strings of equal length in which a bit is set if it has the value one (or on) and signatures are combined by OR-ing, but the invention could be implemented with various other kinds of signatures, including binary strings in which a bit is set if it has the value zero (or off) and signatures are combines by AND-ing.

In the implementations described above, term signatures include k bits that are set, where k is chosen to be optimal, but the invention could be implemented with term signatures that have non-optimal values of k or that do not have equal numbers of bits that are set.

In the implementations described above, each semantic region's formula and signature are both stored in the cache, but the invention could be implemented in other ways, such as by storing only a region's formula and obtaining the region's signature from the formula only when needed.

In the implementations described above, cache entries are replaced based on a replacement function value indicating how recently each item was used. Various other replacement techniques could be used, including techniques based on frequency of use.

In the implementations described above, a set of tuples is stored for each semantic region, but the invention could be implemented with various other types of cache contents, including pages.

The implementations described above in relation to FIGS. 6A–6C and 8A–8D exemplify two different caching algorithms based respectively on relations of semantic containment and intersection between a query and the semantic regions. The invention could be implemented with various other caching techniques based on these and other relationships between a query and semantic regions.

In the implementations described above, specific acts are performed that could be omitted or performed differently. For example, query signatures could be compared with region signatures in various other ways, and the comparisons could be performed serially as suggested above or in parallel.

In the implementations described above, acts are performed in an order that could be modified in many cases. For example, in FIGS. 6A–6C and 8A–8D, the sequence of the acts is in some cases arbitrary, and could be changed. The implementations described above use currently available computing techniques, but could readily be modified to use newly discovered computing techniques as they become available.

Applications

The invention can be applied to perform caching of Web queries to improve Web page retrieval performance.

The invention could also be applied in many other query caching systems.

Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of obtaining answers to queries using a system that includes memory with a set of locations in memory defining a cache, the cache including, for each of a set of one or more semantic regions, contents that include one or more items of data; the method comprising:

(a) obtaining a query Q;

(b) using the query Q to obtain a query signature $S_Q$; and (c) using the query signature $S_Q$ and a region signature $S_R$ for at least one of the semantic regions to find one or more semantic regions that are qualified and using the contents of at least one of the qualified regions to obtain an answer to the query Q.

2. The method of claim 1, in which the system further includes a user interface device for receiving signals from a user and in which (a) comprises:

receiving signals indicating the query Q from the user interface device.

3. The method of claim 2 in which the system further includes an internet connection and the query Q is a World Wide Web query.

4. The method of claim 1, in which the query Q is a conjunction of terms and in which (b) comprises:

(b1) using each of the terms to obtain a respective term signature; and (b2) combining the term signatures to obtain the query signature $S_Q$.

5. The method of claim 4, in which each term signature is a binary string, all of the term signatures having the same length, and in which (b2) comprises:

performing one or more logical operations to combine the term signatures.

6. The method of claim 1, in which the cache further includes, for each semantic region, a replacement function value and in which (c) further comprises, after obtaining the answer, updating the replacement function value of the region.

7. The method of claim 1, in which the cache further includes, for each semantic region R, the region signature $S_R$, and in which (c) comprises:

(c1) determining whether $S_Q = S_{Ri}$ for any of the semantic regions; if not, determining whether $S_Q \supset S_{Ri}$ for any of the semantic regions; if not, determining whether $S_Q \subset S_{Ri}$ for any of the semantic regions; and (c2) if (c1) determines that $S_Q = S_{Ri}$ for a region, obtaining the contents of the region as the answer to the query; if (c1) determines that $S_Q \supset S_{Ri}$ for one or more regions, obtaining an answer that includes items of data that match the query in the contents of one of the regions; or if (c1) determines that $S_Q \subset S_{Ri}$ for one or more regions, obtaining an answer that includes items of data from the contents of a subset of at least one of the regions.

8. The method of claim 7, in which the cache further includes, for each semantic region, a replacement function value and in which, if (c1) determines that $S_Q \subset S_{Ri}$ for a subset of regions, (c) further comprises:

constructing a query remainder from the query;

sending the query remainder to a server;

upon receiving an answer to the query remainder from the server, replacing the subset of regions with a semantic region equivalent to query Q; and setting the replacement function value for the semantic region equivalent to query Q to a most recent value.

9. The method of claim 8, in which the act of constructing the query remainder comprises:

setting the query remainder to query Q;

for each region in the subset, determining a difference between a formula for the region and the query Q, and if the difference is one term $a_i$ only, constraining the query remainder with $\neg a_i$.

10. The method of claim 1, in which each term has approximately k bits that are set, in which the cache further includes, for each semantic region, the region signature $S_R$, and in which (c) comprises:

(c3) determining whether $S_Q=S_R$ for any of the semantic regions; if not, determining whether $S_Q \cap S_R=S_Q$ for any of the semantic regions; if not, determining whether $|S_Q \cap S_R| \geq |S_R|-k$ for any of the semantic regions; and (c4) if (c3) determines that $S_Q=S_R$ for a region, obtaining the contents of the region as the answer to the query Q; if (c3) determines that $S_Q \cap S_R=S_Q$ for one or more regions, obtaining an answer that includes items of data that match the query Q in the contents of one of the regions; or if (c3) determines that $|S_Q \cap S_R| \geq |S_R|-k$ for one or more regions, obtaining an answer that includes items of data from the contents of a subset of at least one of the regions.

11. The method of claim 10, in which, if (c3) determines that $|S_Q \cap S_R| \geq |S_R|-k$ for one or more regions, (c4) comprises:

constructing a query remainder from the query Q;

sending the query remainder to a server.

12. The method of claim 11, in which the act of constructing a query remainder comprises:

setting the query remainder to query Q, and for each region $R_i$ for which $|S_Q \cap S_R| \geq |S_R|-k$, determining a difference $a_i$ from the query Q and constraining the query remainder with $\neg a_i$.

13. The method of claim 11, In which, if (c3) determines that $|S_Q \cap S_R| \geq |S_R|-k$ for one or more regions, (c4) further comprises, after sending the query remainder to the server and before receiving an answer to the query remainder from the server:

applying a criterion to the region signature $S_R$ for at least one of the semantic regions, the region signature $S_R$ meeting the criterion if either $|S_R|-2k \leq |S_R \cap S_Q| < |S_R|-k$ or $0 \leq |S_R \cap S_Q| < |S_R|-k$; and for a region whose region signature $S_R$ meets the criterion, if an intersection of the region with the query Q is not null, obtaining an answer that includes items of data that match the query Q in the region's contents.

14. The method of claim 11, in which the cache further includes, for each semantic region, a replacement function value and in which (c) further comprises, upon receiving an answer to the query remainder:

(c5) if a set of two or more regions in the cache together contain the query Q, replacing the set of regions that contain the query Q with a new region equivalent to the query Q; if a region R in the cache is a complement to the query Q and a formula $R \cup Q$ is a disjunction, replace the region R with a new region equivalent to the formula $R \cup Q$; and otherwise, adding a new region to the cache equivalent to the query remainder; and (c6) for each region from whose contents one or more items of data are included in the answer to the query Q, updating the region's replacement function value.

15. A system for obtaining answers to queries, the system comprising:

memory, with a set of locations in memory defining a cache, the cache including, for each of a set of one or more semantic regions, contents that include one or more items of data; and a processor connected for accessing the memory; the processor operating to:

obtain a query Q;

use the query Q to obtain a corresponding query signature $S_Q$; and use the query signature $S_Q$ and a region signature $S_R$ for at least one of the semantic regions to find one or more semantic regions that are qualified and using the contents of at least one of the qualified regions to obtain an answer to the query Q.

16. The system of claim 15, further comprising:

a set of one or more user interface devices for providing a user interface; the processor being connected to the set of user interface devices for providing signals to and receiving signals from a user; the processor obtaining the query a by receiving signals indicating the query Q from a user through one of the set of user interface devices; the processor further operating to:

provide the answer to the query a to the user through one of the user interface devices.

17. The system of claim 16, further comprising:

an internet connection to the processor; the query Q being a World Wide Web query.

18. An article of manufacture for use in a system that includes:

memory, with a set of locations in memory defining a cache, the cache including, for each of a set of one or more semantic regions, contents that include one or more items of data;

a storage medium access device for accessing data on storage media; and a processor connected for receiving queries, for accessing the memory, and for accessing data on storage media using the storage medium access device;

the article of manufacture comprising:

a storage medium;

instruction data stored on the storage medium, the instruction data defining a sequence of instructions that can be accessed by the processor using the storage medium access device; the processing, in executing the sequence of instructions:

obtaining a query Q;

using the query Q to obtain a corresponding query signature $S_Q$; and using the query signature $S_Q$ and a region signature $S_R$ for at least one of the semantic regions to find one or more semantic regions that are qualified and using the contents of at least one of the qualified regions to obtain an answer to the query Q.

* * * * *